UNITED STATES PATENT OFFICE.

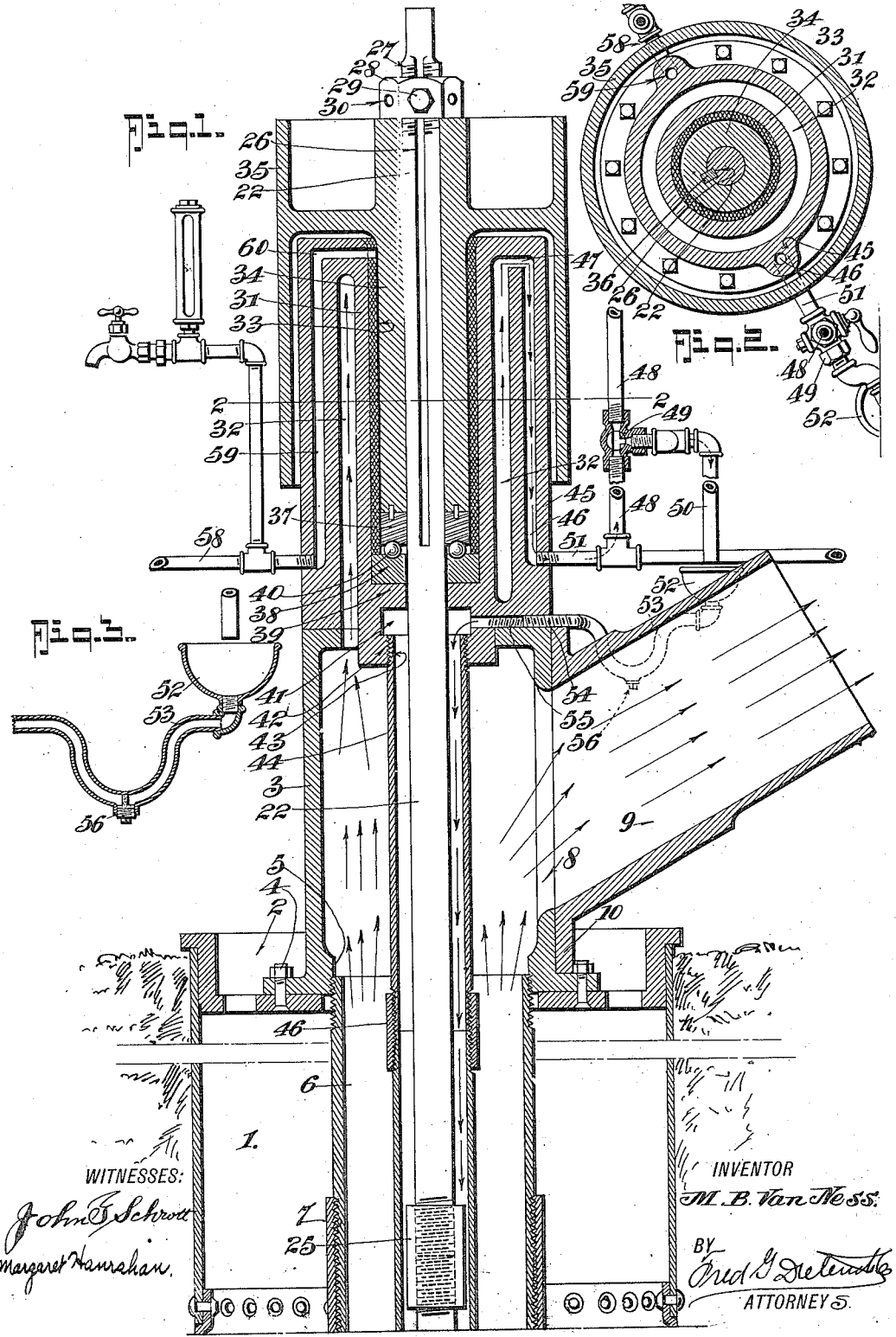

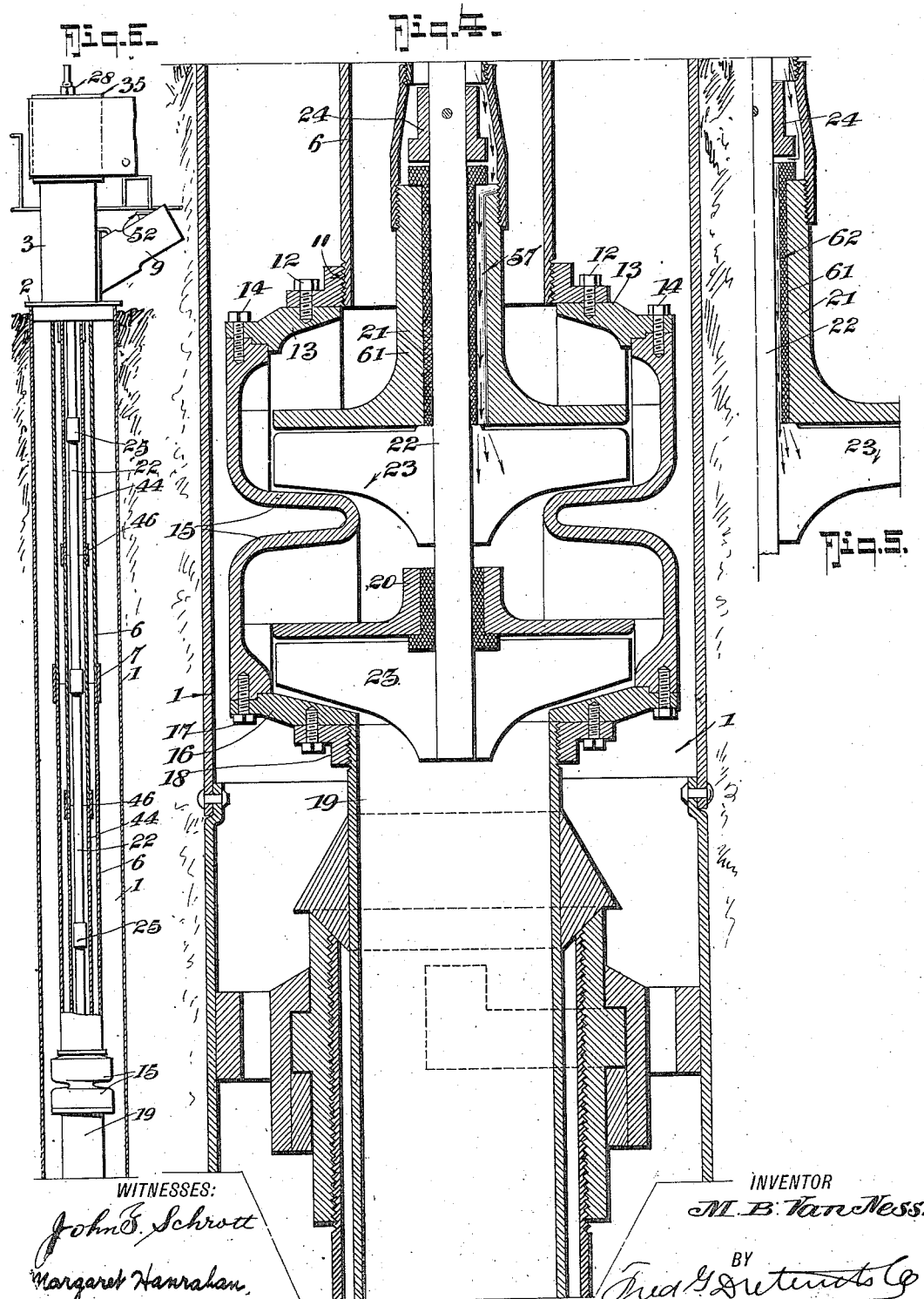

MARVIN B. VAN NESS, OF WELSH, LOUISIANA.

CENTRIFUGAL PUMPING MECHANISM.

1,168,981.  Specification of Letters Patent.   Patented Jan. 18, 1916.

Application filed May 25, 1914. Serial No. 840,784.

*To all whom it may concern:*

Be it known that I, MARVIN B. VAN NESS, residing at Welsh, in the parish of Jefferson Davis and State of Louisiana, have invented certain new and useful Improvements in Centrifugal Pumping Mechanism, of which the following is a specification.

Heretofore it has been the practice in connection with pumping mechanisms of the type to which this invention relates to provide the line shaft with a water tight casing which performs the threefold function of excluding the water and detritus from the shaft and its bearings, of supporting the bearings which are provided at intervals within the shaft casing, and of serving as a conduit for conveying oil to the several bearings successively from the top of the well to the bottom of the shaft casing. The difficulty heretofore encountered in the pumping apparatus of this kind is to aline the bearings properly and yet have them sufficiently snug to prevent the passage of the oil with undue rapidity so as to maintain a certain amount of oil in each section of the shaft casing the oil acting in connection with the several bearings, serving the function of a closure to prevent the water being pumped from being forced up the shaft casing through the pump neck bearing and the successive bearings above the same. If the bearings be not properly alined they will over-heat and the shaft will become "frozen" in its bearings. If, on the other hand, the bearings be made so large that the oil passes freely through the same, the suction of the pump impeller will draw the oil out and contaminate the water.

Another objection to the type of apparatus above referred to, is the expense of manufacture, as all of the bearings must be machined and the shaft casing must be held under great tension in order to assure the alinement of the bearings.

My invention therefore has for its object to overcome, as largely as may be, these objections and to combine a pumping mechanism that will be less expensive to manufacture: one in which the use of bearings, intermediate the top and bottom bearings is made unnecessary regardless of the depth to which the pump may be installed; one in which the use of oil lubricant in the shaft casing may be avoided; and one in which the circulation of clean well water may be had through the shaft casing to fill the casing from top to bottom and form a path or fluid cushion in which the shaft runs, the fluid acting as a cushion, to prevent, to a large degree, lateral vibration or whipping of the shaft, and thus making the use of a series of intermediate guide bearings unnecessary.

In addition to providing means for accomplishing the foregoing objects, the invention also resides in the provision of those novel details of construction, combination and arrangement of parts, all of which will be first fully described, and then be specifically pointed out in the appended claims, reference being had to the accompanying drawings, in which:

Figure 1, is a central longitudinal vertical section of the upper part of the pumping mechanism. Fig. 2 is a cross section on the line 2—2 of Fig. 1. Fig. 3 is a detail section of a part of the invention. Fig. 4 is a vertical longitudinal section of the lower end of the pumping apparatus. Fig. 5 is a vertical longitudinal section of a modification of the pump neck bearing. Fig. 6 is a diagrammatic vertical section and part elevation showing the apparatus made with several sections of pipe.

In the drawings in which like numerals and letters of reference indicate like parts in all of the Figures, 1 is the pit or well casing, which may be of the ordinary construction, and which, at the top receives the pit top 2.

3 is the pump head which is secured to the pit top 2, as at 4, the pump head 3 having an internal thread 5 at its lower end to receive the water pipe 6. The pipe 6 may be made either in a single length or in sections joined together as at 7, depending on the depth of the well, and as may be made necessary by the requirements of the particular well in which the mechanism is to be employed.

9 is the outlet pipe for the water which is joined at 10 over the discharge opening 8, of the pump head 3.

15 designates the pump casing which in the present form of the invention is of the duplex type and has its ends closed by the caps 13 and 16, which are secured at 14 and 17, respectively to the casing 15. To the upper cap 13. the union 11 that receives the lower end of the water pipe 6, is fastened as at 12 so as to bring the pipe 6 in connection with the interior of the casing 15.

The suction pipe 19 is connected to the casing 15 through the medium of the union 18. The pump casing 15 incloses the partitions which carry the shaft bearings 20 and 21 respectively and also inclose the impellers 23. 24 is the lower thrust bearing which is secured to the shaft 22, it being of course understood that when the water pipe 6, and the shaft casing 44, are made in sections, the shaft 22 would also be made in sections, coupled together by sleeves 25, as is the usual practice. The shaft 22, at its upper end, has a feather slot or groove 26 in which the key or feather 36 of the driving pulley 35 lies, and with which the set screw 29 of the adjusting nut 28, coöperates. The adjusting nut 28 has each face tapped at 30 to receive the set screw 29, whereby minute adjustments may be made, and the set screw always enters into the groove 26 to assure non-slipping of the adjusting nut, it being understood of course that the upper end of the shaft 22 will be threaded as at 27 to receive the nut 28.

31 is the main bearing member that fits on the pump head 3 and supports the line shaft 22 and the impellers 23. The bearing 31 is pocketed and bushed with bearing metal as at 33 to receive the long hub 34 of the pulley 35.

37 is the upper ball race member that turns with the head 34 and between which and the lower ball race member 38, the anti-friction bearings 40, are located, the members 37, 38 and 40 acting as a thrust bearing for the shaft 22. Below the web 39 of the bearing member 31, the said member is counter-bored as at 41 and tapped as at 42 to receive the upper end of the shaft casing 44 which is threaded at 43 to coöperate with the threads 42.

The shaft casing 44 is usually formed of sections of any convenient length and united by suitable couplings 46. The casing serves the dual function of keeping the moving column of water in the discharge casing 6 away from the shaft and acts as a container for the water cushion that serves to restrain the longitudinal shaft against lateral vibration. The water with the sand and detritus that passes up through the discharge pipe 6, thus does not come in contact with the shaft and in order to obtain a supply of clean water for filling the shaft casing or circulating through the same, I have provided means for separating, as it were, the sand and detritus from a portion of the water pumped and conveying the water from which the sand and detritus has been separated, into the line shaft casing 44.

In order to keep the casing 44 filled with clean well water, i. e., water free from sand and detritus, the head bearing 31 is provided with an enlargement 45 which has a duct 46 that communicates with the water jacket space 32 at the top of the same. The water which is forced into the water jacket space 32 is still water and as the sand and detritus is heavier than the water, it settles in the space 32 and passes out through the discharge 9 with the discharge water.

A pipe 51 conveys the cooling water from the top of the jacket 32 (at the place where it has the least impurities) into the discharge of the pump. This pipe 51 is tapped and provided with a branch 48 in which there is a cock 49 by means of which a portion of the water may be delivered into the pipe 50 which discharges into a cup 52 that is piped up at 53—54 with a bore 55 that leads into the pocket 41 and therethrough discharges into the casing 44. The pipe 48, it will be noticed extends vertically and thus, in connection with the duct 46 and a portion of the pipe 51, forms a U or trap in which any sand or detritus that might pass through the bore 47 will be precipitated and passed out through the discharge end of the pipe 51, it being understood that the valve 49 is located at a higher level than the discharge of the pipe 51, so that the sand may be cast out.

The connection 53—54 may be provided with a trap and screen 56 to screen the water that passes into the chamber 41 although in practice I find that the precipitation of the sand and detritus is usually complete before the water enters the cup 52 and hence the use of the screen 56 is not always necessary.

In order that the water may be circulated in the casing 44 and the same be kept constantly filled with fresh water, the pump neck bearing 21 may be provided with a groove 57 that opens adjacent to the upper suction zone of the impeller 23, so that the suction produced by the impeller will tend to evacuate the casing 44. Instead of providing the pump neck bearing 51 with the groove 57, the bushing 61 may have one or more grooves 62 so that when the pump is running and the lower thrust bearing 24 is raised off the bushing (as it always should be under operative conditions, since this bearing is an emergency one only) the suction will aid gravity in tending to evacuate the casing 44 and hence maintain a circulation of water in the same.

The latter form indicated in Fig. 5 is particularly advantageous for the reason that when the pump is idle and bearing 24 is dropped onto the bushing 61, it will form a closure for the groove 62 and permit the casing 44 to be filled with oil, kerosene or other substance to prevent rust. This is especially advantageous in the rice country where the pump lies idle several months in the year.

From the foregoing description, taken in connection with the accompanying drawings, it is thought the complete construction, operation and advantages of my invention will be readily understood by those skilled in the art to which it appertains.

What I claim is:

1. In a centrifugal pumping apparatus, the combination with a centrifugal pump, a well casing in which said pump is suspended, a pit top on said casing, a pump head mounted on said pit top and having a water discharge outlet, a discharge pipe consisting of a plurality of sections removably coupled together and coupled with said pump head and with the pump bowl of said centrifugal pump, said centrifugal pump including a pump neck bearing, a head bearing mounted on said pump head, a line shaft extending through said head bearing and coupled with the impeller shaft section of the centrifugal pump, said line shaft comprising a plurality of sections coupled together, a line shaft casing surounding said line shaft and consisting of a plurality of sections coupled together, the end ones of said sections being coupled respectively to the head bearing and the pump neck bearing, said shaft casing being of greater diameter than the greatest diameter of the line shaft and its couplings whereby to provide a free passage through which the line shaft may be endwise drawn without obstruction.

2. In an apparatus of the class described, the combination with the centrifugal pump which includes a bowl, an impeller, a stub or impeller shaft section and a pump neck bearing for said shaft section, of a sectional water discharge duct for suspending said pump bowl, a pit top, a pump head mounted on said pit top to which said water discharge duct is secured, a head bearing, a sectional shaft casing secured to said head bearing and to said pump neck, said shaft casing having an uninterrupted passage from end to end, and a sectional line shaft projecting through said shaft casing and secured to said impeller shaft section, said line shaft passing through said head bearing and a drive pulley mounted on said line shaft.

3. A centrifugal pump comprising the following elements in combination, a discharge casing suspending said pump in the well, a pump shaft passing through said discharge casing to the top of the well, a shaft casing incasing said shaft, a drive pulley and a bearing therefor mounted at the top of the well, a water jacket for said bearing, said jacket being in communication with the discharge column of water and means for conveying the water from said jacket into the shaft casing.

4. A centrifugal pump comprising the following elements in combination, a sectional discharge casing, a sectional pump shaft passing through said casing from the pump to the top of the well, a sectional shaft casing inclosing said shaft, a driving pulley, and a bearing therefor mounted at the top of the well, a water jacket for said pulley bearing, said jacket being in communication with the discharge column of water, means for conveying the water from said jacket into the shaft casing, and means for separating the sand and detritus from the water prior to conveying the water into the shaft casing.

5. In a centrifugal pumping apparatus the following elements in combination, a pump having a pump neck bearing, a pump head, a line shaft extending from the pump to the pump head, a closed pipe incasing said shaft, a discharge casing surrounding said pipe from the pump to the top of the well, and means for maintaining said shaft pipe filled with clean water, said shaft pipe having its walls of substantially uniform diameter from the top to the bottom and composed of a plurality of sections coupled together, and said shaft rotating freely within said pipe.

6. In an apparatus of the class described, the combination with the centrifugal pump which includes a bowl, an impeller, a stub or impeller shaft section and a pump neck bearing for said shaft section, of a sectional water discharge duct for suspending said pump bowl, a pit top, a pump head mounted on said pit top to which said water discharge is secured, a head bearing, a sectional shaft casing secured to said head bearing and to said pump neck, said shaft casing having an uninterrupted passage from end to end, a sectional line shaft projecting through said shaft casing and secured to said impeller shaft section, said line shaft passing through said head bearing, a drive pulley mounted on said line shaft, and means for passing a lubricant down through said shaft casing to lubricate said pump neck bearing.

7. In a well mechanism, in combination with a rotary pump, a pump shaft, a casing surrounding the shaft from the pump to the top of the well, to protect said shaft from the rising column of well water, and means for purifying a portion of said well water and delivering it into the shaft casing, said pump including a pump neck bearing to which said shaft casing is attached and said pump having a passage for effecting communication between the interior of said shaft casing and the upper suction zone of the impeller of the rotary pump.

8. In a pumping mechanism, the combination with the pump casing, the pump head, and the water discharge pipe and the line shaft casing that connects said pump casing with said pump head, an impeller and a line shaft, of a head bearing mounted on said pump head and having a passage through which said line shaft projects, said head bearing having an elongated bearing pocket, a pulley having an elongated bearing hub mounted in said pocket and connected to said shaft to turn the same, a thrust bearing in said pocket for said pulley hub, a water cooling jacket surrounding said elongated bearing pocket and means for effecting a circulation of water through said jacket and through said line shaft casing.

9. In a pumping mechanism, the combination with the pump casing, the pump head, and the water discharge pipe and the line shaft casing that connects said pump casing with said pump head, an impeller and a line shaft, of a head bearing mounted on said pump head and having a passage through which said line shaft projects, said head bearing having an elongated bearing pocket, a pulley having an elongated bearing hub mounted in said pocket and connected to said shaft to turn the same, a thrust bearing in said pocket for said pulley hub, a water cooling jacket surrounding said elongated bearing pocket and means for effecting a circulation of water through said jacket, and then into said line shaft casing.

10. In a pumping mechanism, the combination with the pump casing, the pump head, and the water discharge pipe and the line shaft casing that connects said pump casing with said pump head, an impeller and a line shaft, of a head bearing mounted on said pump head and having a passage through which said line shaft projects, said head bearing having an elongated bearing pocket, a pulley having an elongated bearing hub mounted in said pocket and connected to said shaft to turn the same, a thrust bearing in said pocket for said pulley hub, a water cooling jacket surrounding said elongated bearing pocket and means for effecting a circulation of water through said jacket and then separate the sand and detritus from a portion of such circulated water and passing the water that has been freed from the sand and detritus into the shaft casing.

11. In a pump mechanism, the combination with a pump casing, the pump head, the water discharge pipe and the line shaft casing, the impeller and the line shaft, of a head bearing mounted on said pump head and having a passage through which said line shaft projects, a pulley mounted on said line shaft, a thrust bearing carried by said head bearing for said pulley, said head bearing having a water jacket space, means for effecting a circulation of water through said jacket space and means for conveying a portion of such water from the jacket space into the line shaft casing.

12. In a centrifugal pumping apparatus, the combination with a centrifugal pump, a well casing in which said pump is suspended, a pit top on said casing, a pump head mounted on said pit top and having a water discharge outlet, a discharge pipe consisting of a plurality of sections removably coupled together and coupled with said pump head and with the pump bowl of said centrifugal pump, said centrifugal pump including a pump neck bearing, a head bearing mounted on said pump head, a line shaft extending through said head bearing and coupled with the impeller shaft section of the centrifugal pump, said line shaft comprising a plurality of sections coupled together, a line shaft casing surrounding said line shaft and consisting of a plurality of sections coupled together, the end ones of said line shaft casing sections being coupled respectively to the head bearing and the pump neck bearing, said shaft casing being of greater diameter than the greatest diameter of the line shaft and its couplings whereby to provide a free passage through which the line shaft may be endwise drawn without obstruction, and a lower thrust bearing on the impeller shaft section, and means for drawing up on said line shaft to raise said lower thrust bearing from frictional engagement with said pump neck bearing to permit access of lubricant to the pump neck bearing.

13. In an apparatus of the class described, the combination with the centrifugal pump which includes a bowl, an impeller, a stub or impeller shaft section, and a pump neck bearing for said shaft section, of a sectional water discharge duct for suspending said pump bowl, a pit top and a pump head mounted on said pit top to which said water discharge duct is secured, a head bearing, a sectional shaft casing secured to said head bearing and to said pump neck, said shaft casing having an uninterrupted passage from end to end, and a sectional line shaft projecting through said shaft casing and secured to said impeller shaft section, said line shaft passing through said head bearing, a drive pulley mounted on said line shaft, and a lower thrust bearing on the impeller shaft section, and means for drawing up on said line shaft to raise said lower thrust bearing from frictional engagement with said pump neck bearing to permit the access of lubricant to the pump neck bearing.

MARVIN B. VAN NESS.

Witnesses:
H. D. THRUSH,
J. B. BOTTORFF.